United States Patent [19]

Aketagawa et al.

[11] Patent Number: 4,797,732
[45] Date of Patent: Jan. 10, 1989

[54] SUBCARRIER GENERATING DEVICE FOR COLOR SIGNAL PROCESSING CIRCUIT

[75] Inventors: Tokio Aketagawa, Kumagaya; Osamu Shimano, Fukaya, both of Japan

[73] Assignee: Kabushiki Kaisha Toshiba, Kawasaki, Japan

[21] Appl. No.: 29,769

[22] Filed: Mar. 24, 1987

[30] Foreign Application Priority Data

Mar. 26, 1986 [JP] Japan ................... 51-65844

[51] Int. Cl.$^4$ .......................... H04N 9/64; H04N 9/68
[52] U.S. Cl. ........................................ 358/28; 358/19; 358/23
[58] Field of Search ............... 358/19, 17, 28, 23, 358/20, 25; 331/20

[56] References Cited

U.S. PATENT DOCUMENTS

| 3,679,816 | 7/1972 | Avins et al. | 358/19 |
| 3,694,567 | 9/1972 | Kresock | 358/28 |
| 3,878,558 | 4/1975 | Fujisawa et al. | 358/28 |
| 4,207,590 | 6/1980 | Naimpally et al. | 358/28 |
| 4,366,451 | 12/1982 | Kowal | 331/20 |
| 4,468,687 | 8/1984 | Munezawa et al. | 358/19 |

FOREIGN PATENT DOCUMENTS

1237616 10/1967 Fed. Rep. of Germany.

Primary Examiner—Howard W. Britton
Assistant Examiner—Victor R. Kostak
Attorney, Agent, or Firm—Cushman, Darby & Cushman

[57] ABSTRACT

A continuous subcarrier signal generated by a voltage-controlled oscillator is supplied to a harmonic removal filter, where harmonic components contained in the continuous subcarrier signal are removed. The continuous subcarrier signal, whose harmonic components are removed, is supplied to a tint circuit connected to a variable resistor for varying the phase, where it is phase-controlled. The phase-controlled continuous carrier signal is supplied to a subcarrier amplifier, where it is applied with a predetermined processing, and a plurality of continuous carrier signals, whose phases are related in a predetermined manner, are generated.

12 Claims, 8 Drawing Sheets

FIG. 6A
TINT CENTER (K=0)

FIG. 6B
TINT MAX. (K=-1)

FIG. 6C
TINT MIN. (K=-1)

FIG. 7A
TINT CENTER (K=0)

FIG. 7B
TINT MAX. (K=-1)

FIG. 7C
TINT MIN. (K=-1)

SUBCARRIER GENERATING DEVICE FOR COLOR SIGNAL PROCESSING CIRCUIT

BACKGROUND OF THE INVENTION

The present invention relates to a subcarrier generating device for a color signal processing circuit in a color television receiver, and in particular, to a device ideally suited for use in semiconductor integration.

Accompanying the advancements in recent years of the integration technology of signal processing circuits, there has also been a trend toward the integration of color signal processing circuits in color television receivers, including subcarrier generating devices. Such subcarrier generating devices include, for example, a voltage controlled oscillator (VCO), a tint circuit, and a subcarrier amplifier. The VCO generates a continuous subcarrier signal. This continuous subcarrier signal is supplied to the tint circuit as a reference carrier. The tint circuit is connected to a variable resistor used for varying the phase. Accordingly, the phase of the supplied reference carrier is controlled by the adjustment position of the variable resistor. This phase-controlled reference carrier is supplied to the subcarrier amplifier. The subcarrier amplifier shifts the phase of the supplied signal and further performs phase composition, thus providing each type of continuous subcarrier signal such as the carrier R-Y CW used for R-Y signal demodulation and the carrier B-Y CW used for B-Y signal demodulation. These R-Y CW and B-Y CW are supplied to the demodulation circuit. In the circuit, these signals are demodulated in cooperation with the chroma signal, and the R-Y CW and B-Y demodulation-axis CW signals. The R-Y and B-Y demodulated outputs are obtained as a result. Then the R-Y and B-Y demodulated outputs are matrixed, and the G-Y demodulated output is also obtained.

In such a conventional circuit, adjustment of the variable resistor changes the phase of each of the R-Y and B-Y CW signals for the tint adjustment. However, at this time, the relative phase of the R-Y CW and the B-Y CW must be maintained at a fixed value (e.g., at 90°). If there is a shift in this relative phase, the colors on the screen will become unnatural. In addition, because the demodulation of the G-Y signal is obtained by matrixing the R-Y and B-Y demodulated outputs, a shift in the relative phase will bring about a change in the amplitude of the G-Y signal or a change in the relative phase between the G-Y signal and other signals, thus causing the color to become even more unnatural.

In the conventional circuit as described above, when harmonic signals in addition to the fundamental signal are included in the reference carrier signal from the VCO, the adjustment position of the variable resistor will bring about a shift in the relative phase of the R-Y CW and B-Y CW. That is to say, when harmonic signals are included in the output of the VCO, and the variable resistor in the tint circuit is adjusted to adjust the tint, when the variable resistor is at the center value (tint center), when it is at maximum (tint max.), and when it is at minimum (tint min.) values, the relative phase between the subcarrier R-Y CW and B-Y CW will differ. In addition, changes of amplitude and relative phase will appear in the G-Y demodulated output obtained by the matrixing of the R-Y demodulated output and the B-Y demodulated output. As a result of such factors, there will be a deterioration of the color of the reproduced image displayed on the screen of the television receiver, and therefore an unnatural image.

SUMMARY OF THE INVENTION

In view of the above points, an object of the present invention is to provide a subcarrier generating device which can maintain the relative phase between the subcarrier R-Y CW and B-Y CW at a fixed value, even when a harmonic component is included in the VCO output.

According to the present invention, there is provided a subcarrier generating device for a color signal processing circuit, comprising:
  input means for receiving a burst signal, the burst signal being contained in a color video signal;
  oscillating circuit means connected to the input means, and for generating a continuous reference subcarrier signal in phase synchronism with the burst signal;
  harmonic removal filter means connected to the oscillating circuit means, for removing harmonic components contained in the continuous reference subcarrier signal and for outputting a continuous reference subcarrier signal made up of the fundamental wave component;
  control voltage supply circuit means for supplying a tint control voltage; and
  subcarrier signal generating circuit means connected to the harmonic removal filter means and the control voltage supply circuit means, and for applying a predetermined processing to the continuous reference subcarrier signal of the fundamental wave component according to the tint control voltage, to generate a plurality of continuous subcarrier signals whose phases are related in a predetermined manner.

DETAILED DESCRIPTION OF THE PREFERRED EMBODIMENTS

Figure 1:
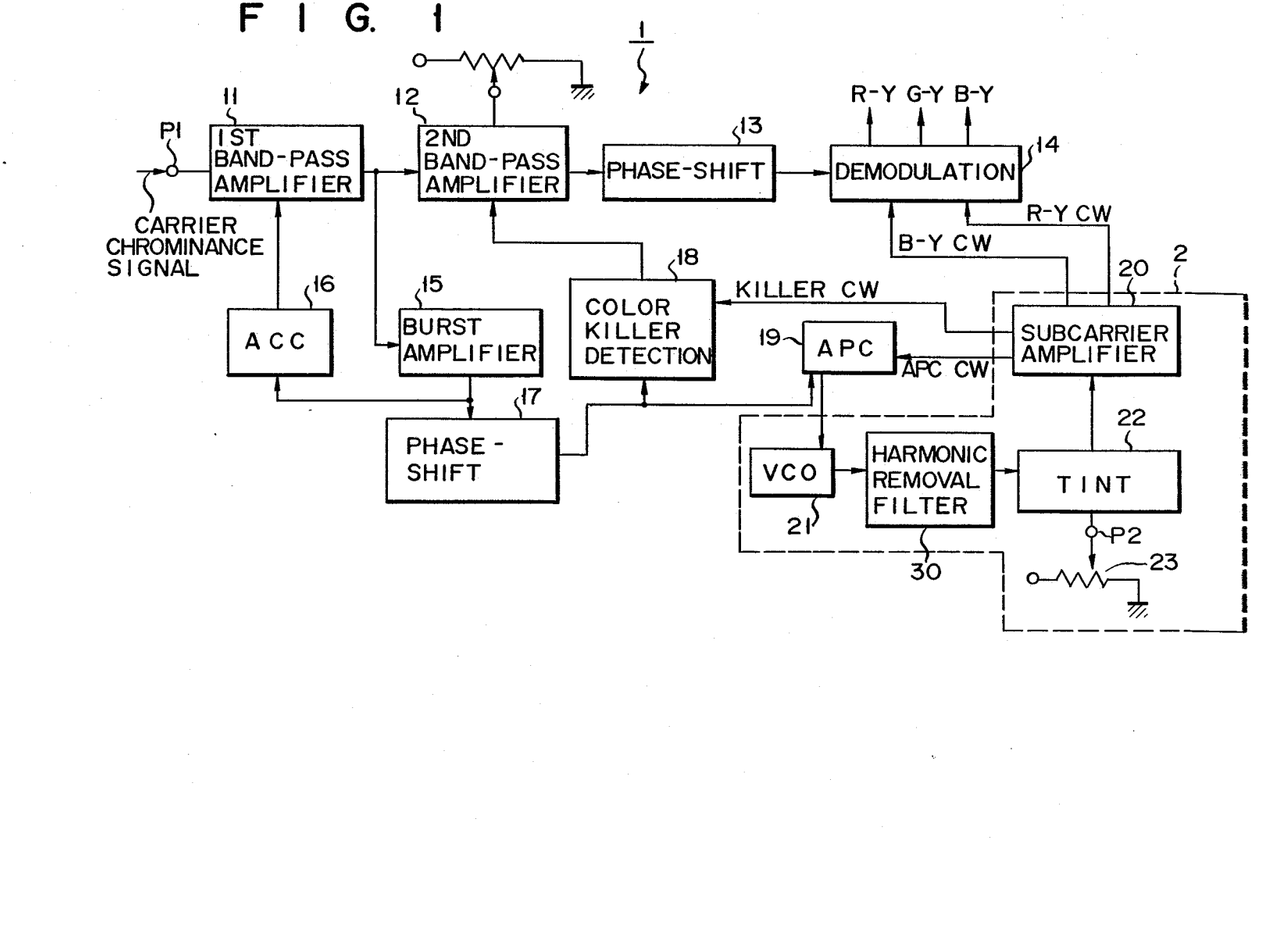
FIG. 1 is a block diagram of a color signal processing circuit in a television receiver, which includes the subcarrier generating device according to the present invention.

An embodiment of the present invention will be explained with reference to the accompanying drawings. FIG. 1 is a block diagram of integrated color processing circuit 1 in a color television receiver, which includes subcarrier generating device 2 according to the present invention. In the figure, a carrier color signal is supplied to input terminal pin P1, is input to first band-pass amplifier 11, and is subject to gain control. After being input to second band-pass amplifier 12 of the next stage, this signal is supplied to demodulation circuit 14 via phase-shift circuit 13. In demodulation circuit 14, demodulation and matrixing are performed and the R-Y, B-Y, and G-Y signals are obtained. These signals are supplied to the drive circuit for the CRT in a later stage (not shown).

The output of first band-pass amplifier 11 is also supplied to burst amplifier 15, from which the burst signal is extracted. This burst signal is supplied to automatic color control (ACC) circuit 16 for use in gain reference of the carrier color signal. This ACC circuit 16 controls the gain of first band-pass amplifier 11 so that the output of first band-pass amplifier 11 has a fixed gain corresponding to the level of the supplied burst signal.

The burst signal extracted from burst amplifier 15 is also supplied to color killer detection circuit 18 and automatic phase control (APC) circuit 19 via phase-shift circuit 17. APC circuit 19 detects the phase difference between the supplied burst signal and the carrier APC CW, which is used for phase control and comes from subcarrier amplifier 20. APC circuit 19 controls the oscillation frequency and the phase of the voltage controlled oscillator (VCO) 21 so that the phase relationship of both of these signals is always a fixed relationship. The color killer detection circuit 18 phase compares the supplied burst signal and the carrier killer CW, which is used for color killer detection and comes from subcarrier amplifier 20. This process detects the absence of the burst signal (i.e., when there is a black-and-white broadcast) or the condition in which the carrier color signal has dropped to a very low level. In such cases, the color killer detection circuit 18 controls second band-pass amplifier 12 and cuts off the color carrier signal.

The oscillation output of VCO 21, which is used as a continuous subcarrier signal, is supplied to subcarrier amplifier 20 via harmonic removal filter 30 and tint circuit 22. This harmonic removal filter 30 eliminates the harmonic components included in the continuous subcarrier signal coming from VCO 21. Tint circuit 22 is connected to variable resistor 23, which is used for varying the phase, via pin P2. Tint circuit 22 controls the phase of the continuous subcarrier signal, which is generated from VCO 21 and is used as a reference carrier, then supplies it to the subcarrier amplifier 20. In subcarrier amplifier 20, the supplied signal is phase-shifted, further undergoes phase-composition processing, and as a result, each type of continuous subcarrier signal is obtained. Subcarrier amplifier 20 supplies the obtained carrier R-Y CW (used for R-Y signal demodulation) and the carrier B-Y CW (used for B-Y signal demodulation) to demodulation circuit 14.

Figure 2:
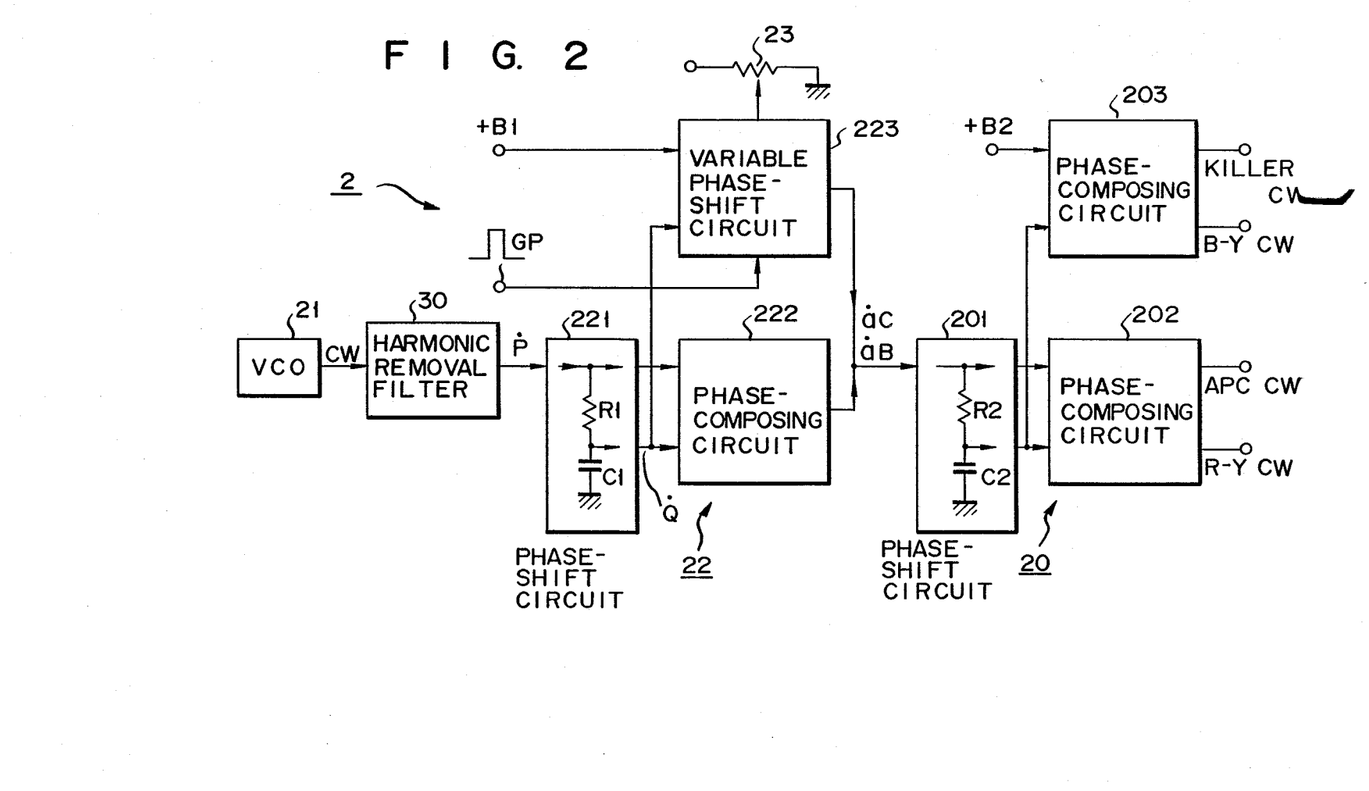
FIG. 2 is a block diagram of the subcarrier generating device according to the present invention.

Subcarrier generating device 2 of FIG. 1 is schematically illustrated in FIG. 2.

The reference carrier (CW) coming from VCO 21 is supplied via harmonic removal filter 30 to phase-shift circuit 221 including resistor R1 and capacitor C1, which is contained in tint circuit 22. This CW signal coming from phase-shift circuit 221 without phase shifting is supplied as the first input of phase-composing circuit 222, whereas the phase-shifted CW signal is input as the second input of phase-composing circuit 222 and as the first input of variable phase-shift circuit 223. The +B1 voltage and the control voltage from variable resistor 23 are also supplied to variable phase-shift circuit 223. In addition, gate pulse GP, which acts to prevent phase control in the burst period, is supplied to this circuit 223. Accordingly, variable phase-shift circuit 223 performs phase control of the subcarrier vector of the chroma signal period. The output of phase-composing circuit 222 and the output of variable phase circuit 223 undergo composition processing and are supplied to phase-shift circuit 201, which constitutes part of color subcarrier amplifier 20 of the next stage.

This phase-shift circuit 201, like phase-shift circuit 221, generates a signal without phase shifting and a phase-shifted signal. The signal without phase shifting is supplied as the first input of the phase-composing circuit 202 and the phase-shifted signal is supplied as the second input of phase-composing circuit 202, as well as the first input of phase-composing circuit 203. The +B2 voltage is also supplied to this phase-composing circuit 203.

In this way, the APC CW signal and the R-Y CW signal are obtained from phase-composing circuit 202. The killer CW signal and the B-Y CW signal are obtained from phase-composing circuit 203.

In subcarrier generating device 2 thus arranged, the harmonic components included in the oscillation output of VCO 21 are removed by harmonic removal filter 30. Accordingly, the relative phase of the R-Y CW and the B-Y CW can always be maintained in a stable condition irrespective of the adjustment position of variable resistor 23.

Setting the input to tint circuit 22 as $\overset{\bullet}{P}$ (given that $|P|=1$), the phase-shifted output of phase-shift circuit 221 as $\overset{\bullet}{Q}$, and the vectors of the subcarriers of the burst period and the chroma period (of the output of tint circuit 22) as $\overset{\bullet}{a}B$ and $\overset{\bullet}{a}C$, respectively, the vectors $\overset{\bullet}{a}B$ and $\overset{\bullet}{a}C$ are $$\overset{\bullet}{a}B = \overset{\bullet}{P} - \overset{\bullet}{Q} = \overset{\bullet}{P} - \frac{Zc1}{R1 + Zc1} \cdot \overset{\bullet}{P}$$

$$= \frac{R1}{R1 + Zc1} \cdot \overset{\bullet}{P}$$

$$\overset{\bullet}{a}C = \overset{\bullet}{P} - \overset{\bullet}{Q} + K\overset{\bullet}{Q} = \frac{R1}{R1 + Zc1} \cdot \overset{\bullet}{P} + \frac{KZc1}{R1 + Zc1} \cdot \overset{\bullet}{P}$$

$$= \frac{R1 + KZc1}{R1 + Zc1} \cdot \overset{\bullet}{P}$$

where R1 is the value o resistor R1 in phase-shift circuit 221, Zc1 is the impedance of capacitor C1 of phase-shift circuit 221, and K is the amount of tint variation ($-1 \leq K \leq 1$)

The input of the next stage, phase-shift circuit 201 of subcarrier amplifier 20, which receives the output subcarrier from tint circuit 22, is divided into the burst period and the chroma period, which are set as $\overset{\bullet}{a}B$ and $\overset{\bullet}{a}C$, respectively. In the same way the output, which is phase-shifted by phase-shift circuit 201, is divided into the burst period and the chroma period, which are set as $\overset{\bullet}{b}B$ and $\overset{\bullet}{b}C$, respectively. With regard to each of the outputs of phase-composing circuits 202 and 203, when the subcarrier used for APC detection of the burst period is set as B APC, the carrier used for killer detection of the burst period as B killer, and the subcarrier used for color demodulation of the chroma period as $C_{R-Y}$ and $C_{B-Y}$, B killer is expressed $$\dot{B}\text{ killer} = \dot{b}B = \dot{a}B \cdot \frac{Zc2}{R2 + Zc2}$$
$$= \frac{R1}{R1 + Zc1} \cdot \dot{P} \times \frac{Zc2}{R2 + Zc2}$$

where R2 is the value of resistor R2 of phase-shift circuit 201 nd Zc2 is the impedanc eof capacitor C2. $\dot{B}$ APC is expressed $$\dot{B}\text{ APC} = \dot{a}B - \dot{b}B$$
$$= \frac{R1}{R1 + Zc1} \cdot \dot{P} - \frac{R1}{R1 + Zc1} \cdot \dot{P} \times \frac{Zc2}{R2 + Zc2}$$

$\dot{C}B - Y$, $\dot{C}R - Y$ are expressed $$\dot{C}B - Y = \dot{b}c = \dot{a}c \cdot \frac{Zc2}{R2 + Zc2}$$
$$= \frac{R1 + KZc1}{R1 + Zc1} \cdot \dot{P} \times \frac{Zc2}{R2 + Zc2}$$

$$\dot{C}R - Y = \dot{a}c - \dot{b}c$$
$$= \frac{R1 + KZc1}{R1 + Zc1} \cdot \dot{P} - \frac{R1 + KZc1}{R1 + Zc1} \cdot \dot{P} \times \frac{Zc2}{R2 + Zc2}$$
$$= \frac{R1 + KZc1}{R1 + Zc1} \cdot \dot{P} \times \frac{R2}{R2 + Zc2}$$

where
$R1 = R2 = R$ and $Zc1 = Zc2 = Zc$   (0), $$\dot{B}\text{ APC} = \left(\frac{R}{R + Zc}\right)^2 \cdot \dot{P} \quad (1)$$

Accordingly, the remaining three vectors, using $\dot{B}$ APC, can be expressed as follows:

$$\dot{B}\text{ killer} = \frac{R}{R + Zc} \times \frac{Zc}{R + Zc} \cdot \dot{P} = \frac{Zc}{R} \cdot \dot{B}\text{ APC} \quad (2)$$

$$\dot{C}B - Y = \frac{R + KZc}{R + Zc} \cdot \dot{P} \times \frac{Zc}{R + Zc} \quad (3)$$
$$= \frac{Zc(R + KZc)}{R^2} \cdot \dot{B}\text{ APC}$$

$$\dot{C}R - Y = \frac{R + KZc}{R + Zc} \cdot \dot{P} \times \quad (4)$$
$$\frac{R}{R + Zc} = \frac{R + KZc}{R} \cdot \dot{B}\text{ APC}$$

Here, when considering the case of input signal $\dot{P}$ being only the fundamental wave, and $$Zc = \frac{1}{j\omega c}$$

is substituted into formulae (1) through (4), the following are obtained:

$$\dot{B}\text{ APC} = \left(\frac{R}{R + \frac{1}{j\omega c}}\right)^2 \times \dot{P} \quad (5)$$
$$= \left(\frac{j\omega cR}{1 + j\omega cR}\right)^2 \cdot \dot{P}$$

$$\dot{B}\text{ killer} \frac{1}{j\omega cR} \cdot \dot{B}\text{ APC} \quad (6)$$

$$\dot{C}B - Y = \frac{1}{R^2 j\omega c} \cdot \left(R + \frac{K}{j\omega c}\right) \cdot \dot{B}\text{ APC} \quad (7)$$
$$= \frac{1}{j\omega cR}\left(1 + \frac{K}{j\omega cR}\right) \cdot \dot{B}\text{ APC}$$

$$\dot{C}R - Y = \frac{R}{R^2}\left(R + \frac{K}{j\omega c}\right) \cdot \dot{B}\text{ APC} \quad (8)$$
$$= \left(1 + \frac{K}{j\omega cR}\right) \cdot \dot{B}\text{ APC}$$

From equation (5), $$|\dot{B}\text{ APC}| = \frac{(\omega cR)^2}{1 + (\omega cR)^2} |\dot{P}| = \frac{(\omega cR)^2}{1 + (\omega cR)^2}$$

is obtained. Accordingly, considering B APC as the reference, $$\dot{B}\text{ APC} = \frac{T1^2}{1 + T1^2} \sin \omega t \quad (9)$$

where $T1 = \omega CR$

Accordingly, formulae (6) through (8) are expressed as follows:

$$\dot{B}\text{ killer} = \frac{1}{T1}\left(\frac{T1^2}{1 + T1^2}\right)\sin(\omega t - 90°) \quad (11)$$

$$\dot{C}B - Y = \frac{1}{T1}\sqrt{1 + \left(\frac{K}{T1}\right)^2} \cdot \quad (12)$$
$$\left(\frac{T1^2}{1 + T1^2}\right)\sin(\omega t - 90° - \theta 1)$$

$$\dot{C}R - Y = \sqrt{1 + \left(\frac{K}{T1}\right)^2} \cdot \left(\frac{T1^2}{1 + T1^2}\right)\sin(\omega t - \theta 1) \quad (13)$$

where $$\theta 1 = \tan^{-1}\frac{K}{\omega cR} \text{ (deg)} \quad (14)$$

Next, consider the time when $\dot{B}$ APC is made up of the fundamental wave and a 3-times harmonic (simplifying the relationship by setting the phase the same as that of the fundamental wave and setting the amplitude as $\alpha$).

$$B\,APC = \frac{T1^2}{1 + T1^2} \sin \omega t + \alpha \frac{T3^2}{1 + T3^2} \sin 3 \omega t \quad (15)$$

$$B\,\text{killer} = \frac{1}{T1}\left(\frac{T1^2}{1 + T1^2}\right)\sin(\omega t - 90°) + \quad (16)$$

$$\frac{1}{T3} \times \alpha \cdot \frac{T3^2}{1 + T3^2} \sin(3\omega t - 90°)$$

$$C\,B - Y = \quad (17)$$

$$\frac{1}{T1}\left(\frac{T1^2}{1 + T1^2}\right)\sqrt{1 + \left(\frac{K}{T1}\right)^2} \sin(\omega t - 90° - \theta 1) +$$

$$\frac{1}{T3} \times \alpha\left(\frac{T3^2}{1 + T3^2}\right)\sqrt{1 + \left(\frac{K}{T3}\right)^2} \sin(3\omega t - 90° - \theta 3)$$

$$C\,R - Y = \sqrt{1 + \left(\frac{K}{T1}\right)^2} \cdot \left(\frac{T1^2}{1 + T1^2}\right)\sin(\omega t - \theta 1) + \quad (18)$$

$$\sqrt{1 + \left(\frac{K}{T3}\right)^2} \times \alpha\left(\frac{T3^2}{1 + T3^2}\right)\sin(\omega t - \theta 3)$$

where $T3 = 3\omega cR$, $\theta 1 = \tan^{-1}\frac{K}{3\omega cR}$ (deg)  (19)

If the output signal of VCO 21 contains harmonic components, a relative phase between the R-Y CW signal and the B-Y CW signal changes when the tint is adjusted by variable resistor 23 of tint circuit 22. This fact will be described using equations (15) to (18).

For obtaining actual waveforms of these signals calculation was made using equations (15) to (18) when $\alpha = 0.3$ (the contained harmonic components are 30% of the fundamental wave), and K was set to $-1$, 0 and $+1$. The obtained waveforms are illustrated in FIG. 8.

Figure 8:
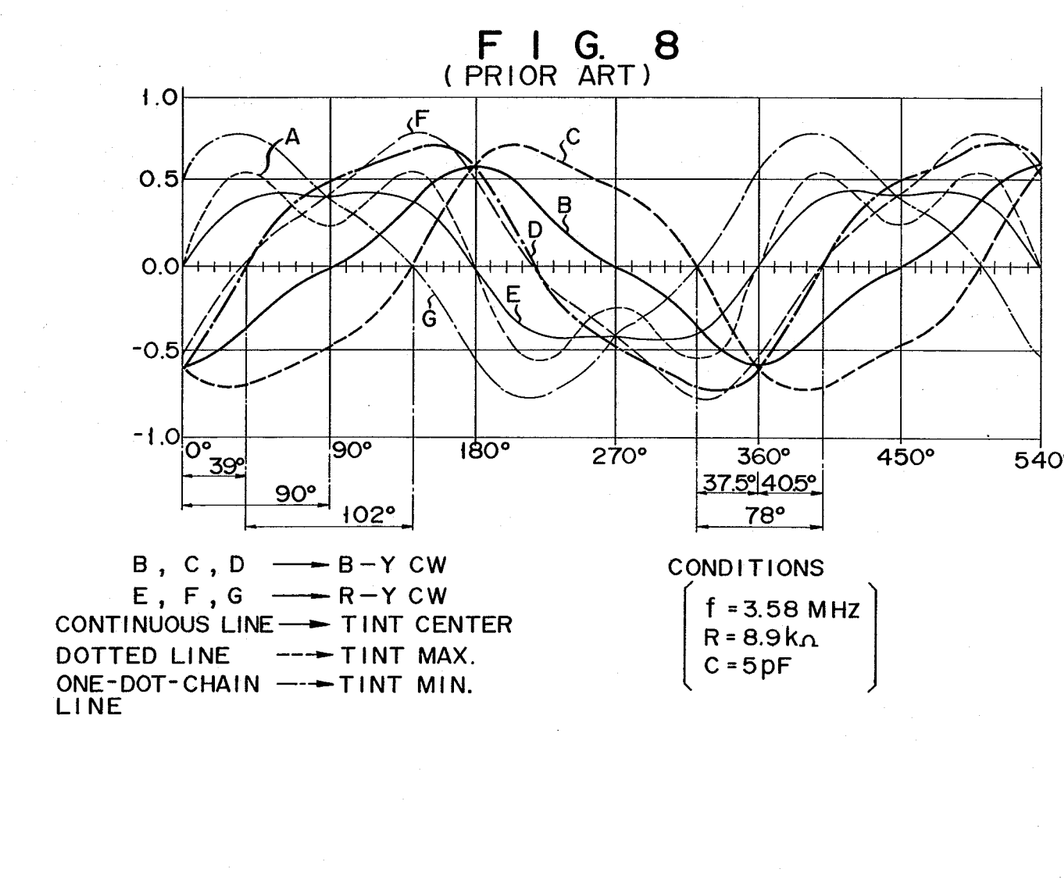
FIG. 8 is a graph representing the calculated waveforms, in the case of containing a harmonic component.

In FIG. 8, a black dotted line (A) indicates a waveform of the APC CW signal. A bold solid line (B) indicates a waveform of the B-Y CW when K=0. A bold dotted line (C) represents a waveform of the B-Y CW when K=−1. A bold one-dot chain line (D) shows a waveform of the B-Y CW for K=1. A thin continuous line (E) is a waveform of the R-Y CW when K=0. A thin dotted line (F) is a waveform of the R-Y CW for K=−1. A thin one-dot chain line (G) represents a waveform of the R-Y CW for K=1.

As seen from FIG. 8, the relative phase between the R-Y CW signal and the B-Y CW signal changes when the tint is changed, viz. K is changed, with respect to the phase of the APC CW (A). The changed relative phases and values of K are shown in Table 1. In FIG. 8, the abscissa represents phase and the ordinate amplitude.

TABLE 1

|  | K = −1 | K = 0 | K = 1 |
|---|---|---|---|
| ∠R-Y CW | −39° | 0° | +37.5° |
| ∠B-Y CW | −141° | −90° | −40.5° |
| (∠R-Y CW)−(∠B-Y CW) | 102° | 90° | 78° |

Figures 9A, 9C:
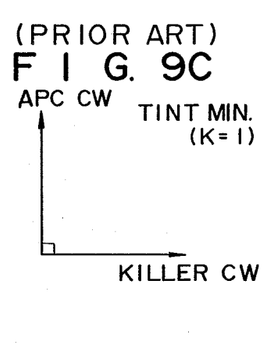
FIGS. 9A to 9C show the vector diagrams, which show the phase difference between the APC CW and the killer CW in the burst period according to the prior art.
Figure 9A:
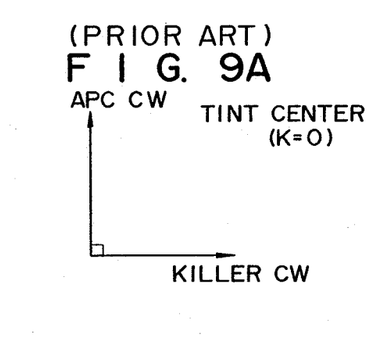
Figure 9B:
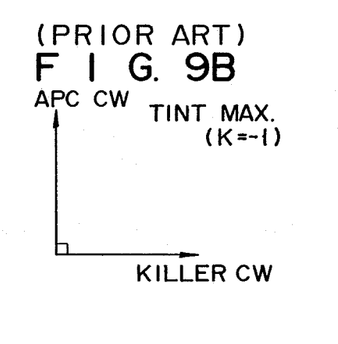
Figure 10A:
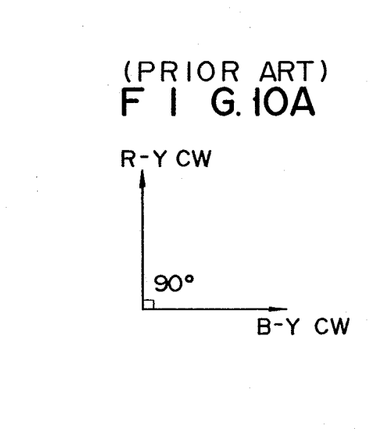
FIGS. 10A to 10C show the vector diagrams illustrating the phase difference between the R-Y CW and B-Y CW in the chroma period according to the prior art.
Figure 10B:
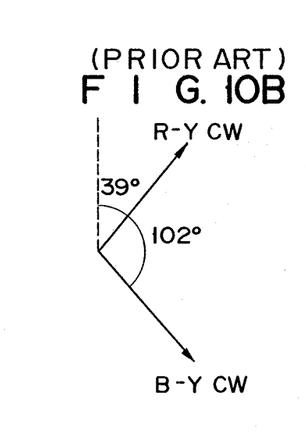
Figure 10C:
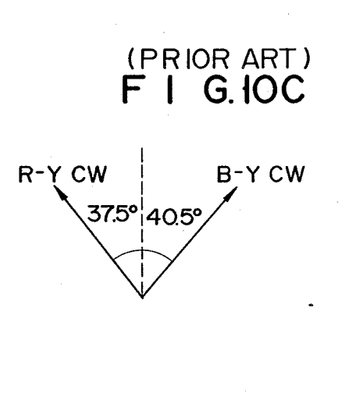

Vector diagrams of the respective CW signals are illustrated in FIGS. 9 to 10. The vector diagrams of FIGS. 9A and 10A are for K=0; those of FIGS. 9B and 10B for K =−1; those of FIGS. 9C and 10C for K=+1.

Figure 3:
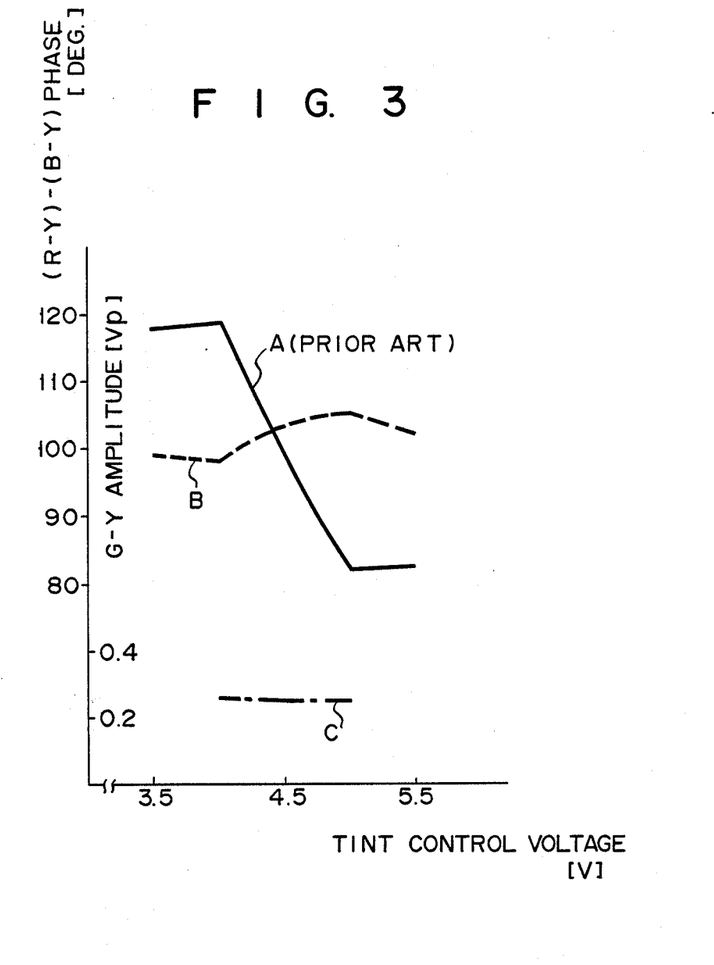
FIG. 3 is a graph showing the variation of the relative phase difference between the R-Y CW and B-Y CW, which results from the tint adjustment, and the variation in the amplitude of the G-Y demodulated output.

The curve (A) in FIG. 3, illustrating an actual waveform by the conventional IC device, shows that the relative phase between the R-Y CW and the B-Y CW changes from about 118° to 82° in the range from maximum tint to minimum tint.

As can be seen from the above analysis, in the case where harmonic components are included in the output of VCO 21 and the tint is adjusted by adjusting variable resistor 23 in tint circuit 22, when variable resistor 23 is set to the center value (K =0) and when it is set to the maximum (K =−1) and minimum (K=1) values, the relative phase of the subcarriers R-Y CW and B-Y CW will differ. In addition, a change in the amplitude and the relative phase of the G-Y demodulated output (obtained by the matrixing of the R-Y demodulated output and the B-Y demodulated output) will be apparent and the color on the screen will become unnatural.

Figure 4:
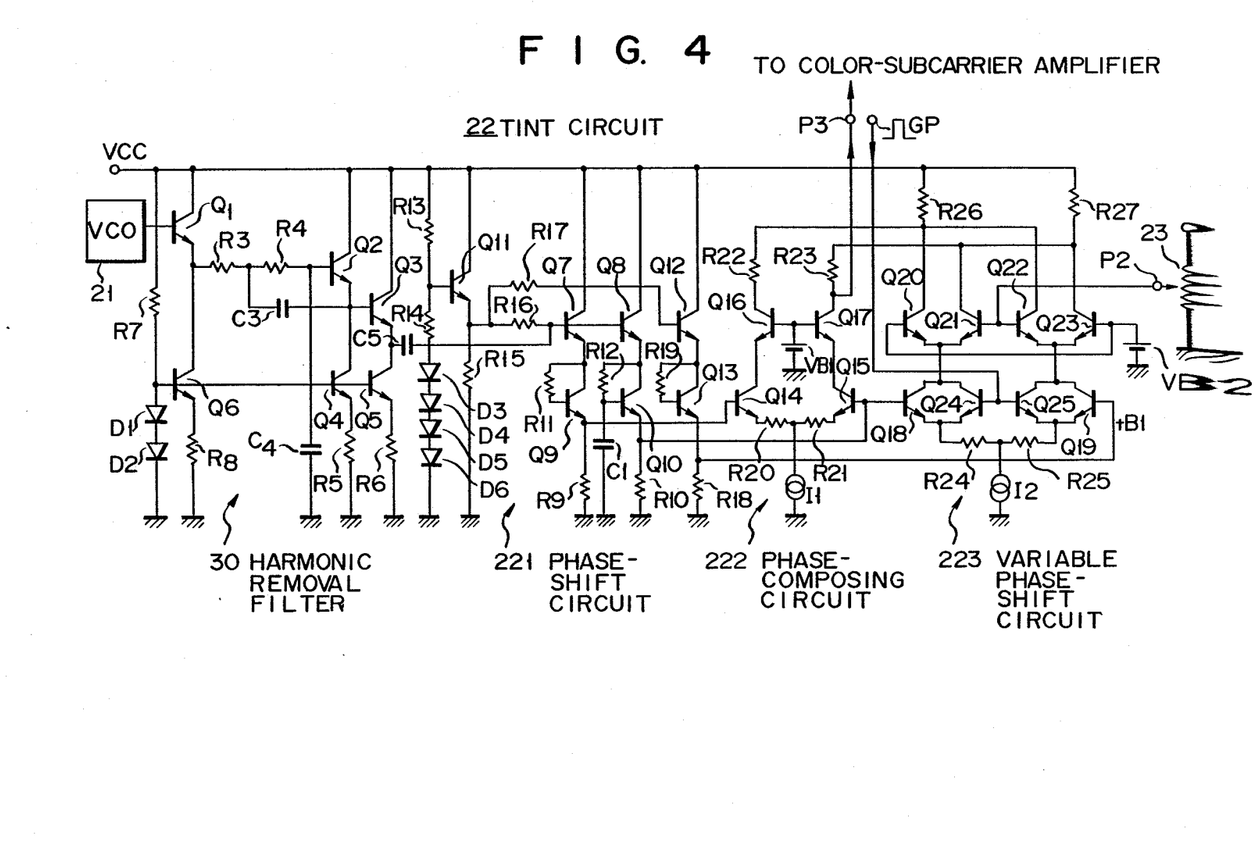
FIG. 4 is an actual circuit diagram of the harmonic removal filter and the tint circuit, which is used in FIG. 2.
Figure 5:
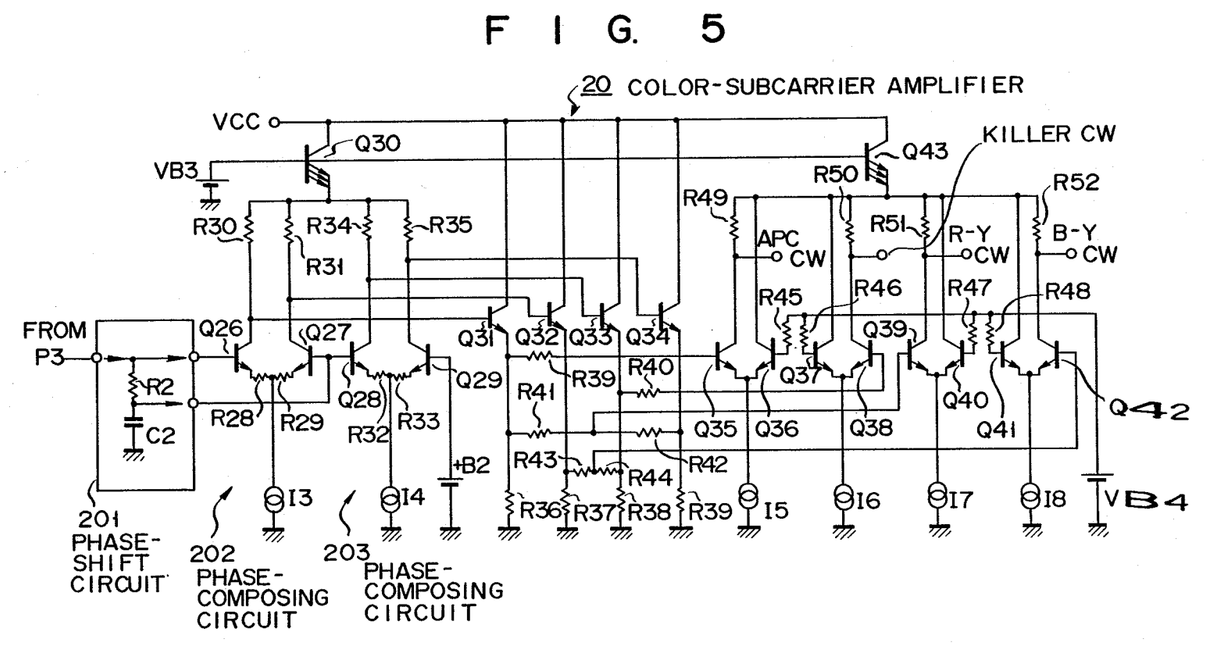
FIG. 5 is an actual circuit diagram of the color subcarrier amplifier of FIG. 2.

Accordingly, this invention employs harmonic removal filter 30, which is especially desirable in an integrated circuit application, in order to remove the harmonic components. With reference to FIGS. 4 and 5, and explanation is given of the detailed circuit structure of subcarrier generating device 2. In these figures, the same symbols are used for portions that are the same as those in FIG. 2.

FIG. 4 shows the VCO 21, harmonic removal filter 30, and tint circuit 22 of the subcarrier generating device according to this invention. A continuous subcarrier signal from VCO 21 is supplied to the base of transistor Q1 as a reference carrier input. The emitter of transistor Q1 is connected to harmonic removal filter 30. Harmonic removal filter 30 comprises transistors Q2 to Q5, resistors R3 to R6, and capacitors C3 and C4. The emitter of transistor Q1 is connected via resistors R3 and R4 to the base of transistor Q2. The connection point of resistors R3 and R4 is connected via capacitor C3 to the base of transistor Q3. The base of transistor Q2 is connected to the reference potential point (ground) via capacitor C4. The emitter of transistor Q2 is connected to the base of transistor Q3 and the collector of transistor Q4. The emitter of transistor Q3 is connected to the collector of transistor Q5. The emitter of transistor Q4 is grounded via resistor R5. The emitter of transistor Q5 is grounded via resistor R6. Transistor Q6, diodes D1 and D2, resistors R7 and R8 constitutes a bias circuit. The combined voltages across diodes D1 and D2 is applied to the bases of transistors Q6, Q4 and Q5. The collector of transistor Q6 is connected to the emitter of transistor Q1. One end of resistor R7 is connected to power source Vcc, and the other end is connected to the anode of diode D1. Resistor R8 is connected between the emitter of transistor Q6 and the ground. The collectors of transistors Q1, Q2 and Q3 are connected to power source Vcc.

The reference carrier signal from VCO 21, whose harmonic components are removed by harmonic removal filter 30, is supplied via coupling capacitor C5 to phase-shift circuit 221 in the succeeding stage.

Phase-shift circuit 221 comprises transistors Q7, Q8, Q9, and Q10. Transistors Q7 and Q8 are supplied at their bases with the signal through capacitor C5. Transistors Q9 and Q10 are respectively connected in series with transistors Q7 and Q8. Resistor R9 is connected between the emitter of transistor Q9 and ground. Resistor R10 is connected between the emitter of transistor Q10 and ground. Resistor R11 is connected between the collector and base of transistor Q9. Phase-shifting capacitor C1 is connected between the base of transistor Q10 and ground. Resistor R12 is connected between the collector and base of transistor Q10.

Transistor Q11, diodes D3 to D6, and resistors R13 to R15 constitute a bias circuit. The emitter of transistor Q11 is connected via resistor R16 to the bases of transistors Q7 and Q8. The emitter of transistor Q11 is also connected via resistor R17 to the base of transistor Q12. The emitter of transistor Q12 is grounded via transistor Q13 and resistor R18. Resistor R19 is connected between the collector and base of transistor Q13. The collectors of transistors Q11, Q12, Q7, and Q8 are connected to power source Vcc.

A reference carrier, which is not phase-shifted, is obtained at the emitter of transistor Q9. A signal phase-shifted by capacitor C1 is obtained at the emitter of transistor Q10. +B1 voltage is obtained from the emitter of transistor Q13.

The output signal from phase-shift circuit 221 is supplied to phase-composing circuit 222 of the succeeding stage and to variable phase-shift circuit 223.

Phase-composing circuit 222 comprises transistor Q14 and Q15. Transistors Q14 and Q15 make up a differential amplifier. Transistor Q14 is supplied at the base with the un-phase-shifted signal. Transistor Q15 is supplied at the base with the phase-shifted signal. The emitters of transistors Q14 and Q15 are connected to common constant current source I1, respectively via resistors R20 and R21. The collector of transistor Q14 is connected to one end of resistor R22 via the emitter-collector path of transistor Q16. Similarly, the collector of transistor Q15 is connected to one end of resistor R23 via the emitter-collector path of transistor Q17. The bases of transistors Q16 and Q17 are connected to bias source VB1.

Variable phase-shift circuit 223 comprises transistors Q18 to Q25. Transistors Q18 to Q23 make up a double-balanced type differential amplifier. Transistors Q24 and Q25 are made conductive during the burst period by gate pulse GP. The emitters of transistors Q18 and Q24, and those of transistors Q19 and Q25, are connected to common constant current source I2 via resistors R24 and R25, respectively. The signal phase-shifted by phase-shift circuit 221 is supplied to the base of transistor Q18. +B1 voltage is applied to the base of transistor Q19. Since transistors Q18 and Q19 are respectively in parallel with transistors Q24 and Q25, and transistors Q24 and Q25 are turned on during the burst period, the signal is not transferred to the succeeding stage during the period. The tint control voltage from variable resistor 23 is applied to the bases of transistors Q21 and Q22 via pin P2. A phase-varied signal is obtained from the collectors of transistors Q20 and Q22. The signal is phase-varied depending on the difference between the tint control voltage and the bias source VB2 which is applied to transistors Q20 and Q23. The collectors of transistors Q20 and Q22 are connected to power source Vcc via resistor R26. The collectors of transistors Q21 and Q23 are connected to power source Vcc via resistor R27. The other ends of resistors R22 and R23 of phase-composing circuit 222 are respectively connected to the collectors of transistors Q20 and Q23.

The outputs of phase-composing circuit 222 and variable phase-shift circuit 223 are obtained as a vector-composed signal from the collector (terminal P3) of transistor Q17. The output signal is supplied to subcarrier amplifier 20 in the succeeding stage.

As shown in FIG. 5, subcarrier amplifier 20 comprises phase-shift circuit 201, phase-composing circuits 202 and 203, and an amplifier. The amplifier appropriately vector-composes and amplifies the outputs of phase-composing circuits 202 and 203, and obtains various CW signals.

Phase-shift circuit 201 may be the same as phase-shift circuit 221 in FIG. 2. Therefore, it is schematically illustrated. The phase-shifted signal and the un-phase-shifted signal from phase-shift circuit 201 are supplied to phase-composing circuits 202 and 203. The un-phase-shifted signal is supplied to the base of transistor Q26 of phase-composing circuit 202. The signal phase-shifted by capacitor C2 is supplied to the base of transistor Q27. The emitters of transistors Q26 and Q27 are connected to common constant current source I3 via resistors R28 and R29, respectively. The collectors of transistors Q26 and Q27 are connected to the emitter of transistor Q30 via resistors R30 and R31, respectively.

The signal phase-shifted by capacitor C2 is supplied to the base of transistor Q28 of phase-composing circuit 203. +B2 voltage is applied to the base of transistor Q29. The emitters of transistors Q28 and Q29 are connected to common constant current power source I4 via resistors R32 and R33, respectively. The collectors of transistors Q28 and Q29 are connected to the emitter of transistor Q30 via resistors R34 and R35, respectively.

Figure 6A:
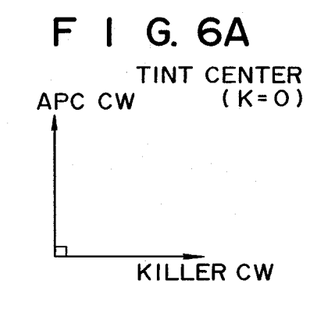
FIGS. 6A to 6C show the vector diagrams, which show the phase difference between the APC CW and the killer CW in the burst period.
Figure 6B:
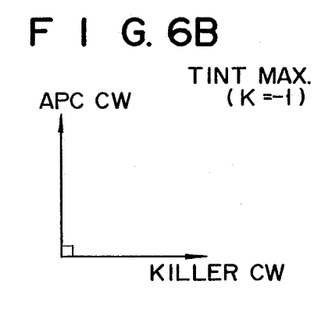
Figure 6C:
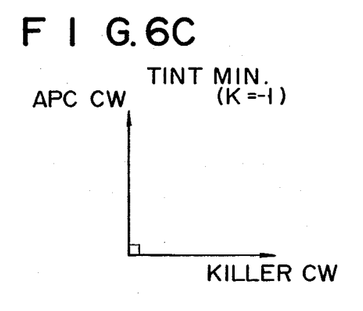
Figure 7A:
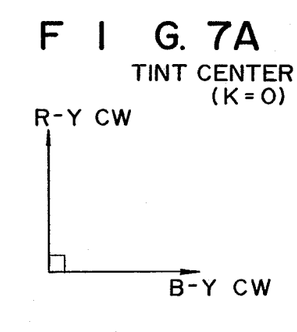
FIGS. 7A to 7C show the vector diagrams illustrating the phase difference between the R-Y CW and B-Y CW in the chroma period.
Figure 7B:
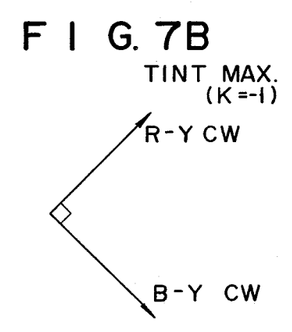
Figure 7C:
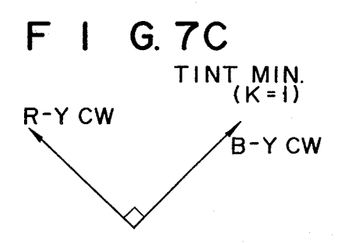

Various CW signals are obtained at the collectors of transistors Q26 to Q29. These signals will be described with reference to FIGS. 6A to 6C and FIGS. 7A to 7C. FIGS. 6A to 6C show the phases of the outputs at the collectors of transistors Q27 and Q29 during the burst period. FIGS. 7A to 7C show those of the same transistors during the chroma signal period. FIGS. 6A and 7A show the output phases when variable resistor 23 is at the center (K=0), FIGS. 6B and 7B when variable resistor 23 is at the maximum (K=−1), and FIGS. 6C and 7C when it is at the minimum (K=1).

As shown in FIGS. 6A to 6C, during the burst period, an APC CW signal is obtained at the collector of transistor Q27. A killer CW signal is obtained at the collector of transistor Q29. The phases of the signals are always the same, irrespective of the value of variable resistor 23. During the the burst period, a signal with a phase opposite to that of the APC CW signal at the collector of transistor Q27 is obtained at the collector of transistor Q26. A signal with a phase opposite to that of the killer CW signal at the collector of transistor Q29 is obtained at the collector of transistor Q28.

During the chroma signal period, a R-Y CW signal is obtained at the collector of transistor Q27. A B-Y CW signal is obtained at the collector of transistor Q29. By changing the value of variable resistor 23, the R-Y CW and B-Y CW signals are phase-shifted, as shown in FIGS. 7A to 7C. During the chroma signal period, a signal with the phase opposite to that of the output at the collector of transistor Q27 is obtained at the collector of transistor Q26. A signal with a phase opposite to that of the output at the collector of transistor Q29 is obtained at the collector of transistor Q28.

The vectors of the various CW signals at the collectors of transistors Q27 and Q29 are expressed $$B\ APC = \frac{T1^2}{1 + T1^2} \sin \omega t \qquad (20)$$

-continued $$B \text{ killer} = \frac{1}{T1}\left(\frac{T1^2}{1+T1^2}\right)\sin(\omega t - 90°) \quad (21)$$

$$CB - Y = \quad (22)$$

$$\frac{1}{T1}\left(\frac{T1^2}{1+T1^2}\right)\sqrt{1+\left(\frac{K}{T1}\right)^2} \cdot \sin(\omega t - 90° - \theta 1)$$

$$CR - Y = N\frac{T1^2}{1+T1^2}\sqrt{1+\left(\frac{K}{T1}\right)^2} \cdot \sin(\omega t - \theta 1) \quad (23)$$

As seen from the above equations, unlike the signals expressed by the expressions (15) to (18), these signals have no harmonic components.

As is understood from FIGS. 7A to 7C, the R-Y CW and B-Y CW signals maintain their fixed relative phase difference (for example, 90°), irrespective of the resistance change of variable resistor 23.

In this way, various CW signals can be obtained from phase-composing circuits 202 and 203. However, there are cases where it is preferable, from the standpoint of a pleasing visual image, to set the phase difference of the CW signals to an angle other than 90°. In such cases, a resistor matrix, for example, may be used such as the matrix invented by Aketagawa et al. and assigned to KABUSHIKI KAISHA TOSHIBA, applied for on June 29, 1983 and bearing Japanese Patent Application No. 58-138862 (Kokai No. 60-30293), No. 58-138867 (Kokai No. 60-30291), and No. 58-138868 (Kokai No. 60-30292).

For example, as shown in FIG. 5, the respective signals from the collectors of transistors Q26 to Q29 are supplied to the bases of transistors Q31 to Q34 of the next stage. Signals with desired phase angles can be obtained by means of the resistor matrix made up of resistors R36 to R44 provided to the emitters of transistors Q31 to Q34. In the embodiment, an amplifier is provided in the next stage made up of pairs of transistors Q35 and Q36, Q37 and Q38, Q39 and Q40, and Q41 and Q42, and constant current sources I5, I6, I7, and I8 for these pairs of transistors. As described above, the APC CW, killer CW, R-Y CW, and B-Y CW signals having desired phase angles can be obtained at the collectors of transistors Q35, Q38, Q39, and Q42.

The signal from the emitter of transistor Q31 is supplied via resistor R39 to the base of transistor Q35. The signal from the emitter of transistor Q33 is supplied via resistor R40 to the base of transistor Q38. The signals from the emitters of transistors Q31 and Q34 are respectively matrixed by resistors R41 and R42, and the matrixed signals are supplied to the base of transistor Q39. The signals from the emitters of transistors Q32 and Q33 are matrixed by resistors R43 and R44, and the matrixed signal is supplied to the base of transistor Q42. The bases of transistors Q36, Q37, Q40, and Q41 are connected to bias source VB4, respectively via resistors R45 to R48. The collectors of transistors Q35, Q38, Q39, and Q42 are connected to the emitter of transistor Q43, respectively via resistors R49 to R52. The collectors of transistors Q36, Q37, Q40, and Q41 are connected to the emitter of transistor Q43. The base of transistor Q30 is connected to bias source VB3. The collectors of transistors Q30 to Q34, and Q43 are connected to power source Vcc.

The subcarrier generating device 2 thus constructed is characterized in that harmonic removal filter 30 is provided to the output of VCO 21, and only the reference carrier signal, i.e. the fundamental wave signal, is obtained from the output signal of VCO 21, and the signal is supplied to the succeeding stage. The curve (B) in FIG. 3 shows an actual waveform by IC device applied the present invention. As shown by dotted line B, in the device 2 of the invention, even if the harmonic component is contained in the input CW signal as a reference, the relative phase difference between demodulating CW signals (R-Y CW and B-Y CW), can remain practically unchanged, irrespective of tint control. The demodulated output signal G-Y obtained by matrixing the R-Y demodulated output signal and the B-Y demodulated output signal, has a substantially constant amplitude, as shown by one-dot-chain line C in FIG. 3.

Therefore, the change of the amplitude and the relative phase shift can be prevented, thus providing a natural color.

It should be understood that this invention is not limited to the embodiment as mentioned above, but can be changed and modified within the scope of this invention.

What is claimed is:

1. A subcarrier generating device for a color signal processing circuit, comprising:
   input means for receiving a burst signal, said burst signal being a part of a color video signal;
   oscillating circuit means, for generating a continuous reference subcarrier signal;
   harmonic filter means, connected to said oscillating circuit means, for removing harmonic components contained in said continuous reference subcarrier signal and for outputting a filtered continuous reference subcarrier signal;
   tint control signal supply circuit means for supplying a tint control signal;
   subcarrier signal generating circuit means connected to said harmonic removal filter means and said control voltage supply circuit means, for generating a plurality of reference carrier signals by performing a predetermined processing on said filtered continuous reference subcarrier signal, accoridng to said tint control signal, the phases of said reference carrier signals being related to one another in a predetermined manner; and
   phase control means for receiving said burst signal from said input means and one of said reference carrier signals from said subcarrier signal generating circuit means, detecting a phase difference between said burst signal and said reference carrier signal, and controlling the frequency and phase of said continuous reference subcarrier signal generated by said oscillating circuit means such that said burst signal and said reference carrier signal always have a specific phase relationship to one another.

2. The subcarrier generating device according to claim 1, wherein said oscillating circuit means, said harmonic filter means, and said subcarrier signal generating circuit means are integrated on a single semiconductor integrated circuit chip.

3. The subcarrier generating device according to claim 2, wherein
   said harmonic filter means comprises:

a voltage supply terminal for receiving a predetermined voltage;

a first transistor having a base, a collector and an emitter, whose base is connected to said oscillating circuit means via first and second resistors, and is grounded via a first capacitor, and whose collector is connected to said voltage supply terminal;

a second transistor having a base, a collector and an emitter, whose base is connected to said voltage supply terminal, whose collector is connected to the emitter of said first transistor, and whose emitter is grounded via a third resistor;

a third transistor having a base, a collector and an emitter, whose base is connected to the connection point of said first and second resistors via a second capacitor, and whose collector is connected to said voltage supply terminal; and a fourth transistor having a base, a collector and an emitter, whose base is connected to said voltage supply terminal, whose collector is connected to the emitter of said third transistor, and whose emitter is grounded via a fourth resistor, a continuous reference subcarrier signal with no harmonic components being obtained at the emitter of said third transistor.

4. The subcarrier generating device according to claim 3, further comprising a bias circuit coupling said harmonic filter means to said oscillating circuit means, said bias circuit comprising:

a fifth transistor having a base, a collector and an emitter, whose base is connected to said oscillating circuit means, whose collector is connected to said voltage supply terminal, and whose emitter is connected to the base of said first transistor via said first and second resistors; and a sixth transistor having a base, a collector and an emitter, whose base is connected to said voltage supply terminal via a fifth resistor, and is grounded via a diode, the base being connected to the anode of said diode, whose collector is connected to the emitter of said fifth transistor, and whose emitter is grounded via a sixth resistor.

5. The subcarrier generating device according to claim 1, wherein said harmonic filter means comprises:

a voltage supply terminal for receiving a predetermined voltage;

a first transistor having a base, a collector and an emitter, whose base is connected to said oscillating circuit means via first and second resistors, and is grounded via a first capacitor, and whose collector is connected to said voltage supply terminal;

a second transistor having a base, a collector and an emitter, whose base is connected to said voltage supply terminal, whose collector is connected to the emitter of said first transistor, and whose emitter is grounded via a third resistor;

a third transistor having a base, a collector and an emitter, whose base is connected to the connection point of said first and second resistors via a second capacitor, and whose collector is connected to said voltage supply terminal; and a fourth transistor having a base, a collector and an emitter, whose base is connected to said voltage supply terminal, whose collector is connected to the emitter of said third transistor, and whose emitter is grounded via a fourth resistor, a continuous reference subcarrier signal with no harmonic components being obtained at the emitter of said third transistor.

6. The subcarrier generating device according to claim 5, further comprising a bias circuit coupling said harmonic filter means to said oscillating circuit means, said bias circuit comprising:

a fifth transistor having a base, a collector and an emitter, whose base is connected to said oscillating circuit means, whose collector is connected to said voltage supply terminal, and whose emitter is connected to the base of said first transistor via said first and second resistors; and a sixth transistor having a base, a collector and an emitter, whose base is connected to said voltage supply terminal via a fifth resistor, and is grounded via a diode, the base being connected to the anode of said diode, whose collector is connected to the emitter of said fifth transistor, and whose emitter is grounded via a sixth resistor.

7. A color-signal processing circuit comprising:

a carrier chominance signal input terminal for receiving a carrier chrominance signal;

burst signal extracting circuit means, connected to said carrier chrominance signal input terminal; for processing in a predetermined manner said carrier chrominance signal to extract a burst signal;

subcarrier generating means, connected to said burst signal extracting circuit means, for outputting a plurality of reference carrier signals in synchronism with said burst signal the phases of which are related in a predetermined manner, said subcarrier generating means comprising:

oscillating circuit means, connected to said burst signal extracting circuit means, for generating a continuous reference subcarrier signal in phase synchronism with said burst signal;

harmonic filter means connected to said oscillating circuit means, for removing harmonic components contained in said continuous reference subcarrier signal and for outputting a filtered continuous reference subcarrier signal including a fundamental wave component thereof;

tint control circuit means for supplying a tint control signal;

subcarrier signal generating circuit means connected to said harmonic removal filter means and said control voltage supply circuit means, for generating said reference carrier signals by processing in a predetermined manner said filtered continuous reference subcarrier signal, according to said tint control signal; and phase control means for receiving said burst signal from said burst signal extracting circuit means and one of said reference carrier signals from said subcarrier signal generating circuit means, detecting a phase diference between said burst signal and said reference carrier signal, and controlling the frequency and phase of said continuous reference subcarrier signal generated by said oscillating circuit means such that the said burst signal and said reference carrier signal always have a specific phase relationship; and color difference signal generating circuit means connected to said carrier chrominance signal input terminal and subcarrier generating means, for processing in a predetermined manner said carrier chrominance signal according to said plurality of reference carrier signals, to generate a plurality of color difference signals.

8. The color signal processing circuit according to claim 7, wherein at least said oscillating means, said harmonic filter means, and said subcarrier signal generating means of said subcarrier signal generating circuit means are fabricated on a single semiconductor integrated circuit chip. circuit means are fabricated on a single chip of semiconductor integrated circuit.

9. The color signal processing circuit according to claim 8, wherein
said harmonic removal filter means comprises:
a voltage supply terminal for receiving a predetermined voltage;
a first transistor having a base, a collector and an emitter, whose base is connected to said oscillating circuit means via first and second resistors, and is grounded via a first capacitor, and whose collector is connected to said voltage supply terminal;
a second transistor having a base, a collector and an emitter, whose base is connected to said voltage supply terminal, whose collector is connected to the emitter of said first transistor, and whose emitter is grounded via a third resistor;
a third transistor having a base, a collector and an emitter, whose base is connected to the connection point of said first and second resistors via a second capacitor, and whose collector is connected to said voltage supply terminal; and
a fourth transistor having a base, a collector and an emitter, whose base is connected to said voltage supply terminal, whose collector is connected to the emitter of said third transistor, and whose emitter is grounded via a fourth resistor, a continuous reference subcarrier signal with no harmonic components being obtained at the emitter of said third transistor.

10. The color signal processing circuit according to claim 9, further comprising a bias circuit connecting said harmonic filter means to said oscillating circuit means said bias circuit comprising:
a fifth transistor having a base, a collector and an emitter, whose base is connected to said oscillating circuit means, whose collector is connected to said voltage supply terminal, and whose emitter is connected to the base of said first transistor via said first and second resistors; and
a sixth transistor having a base, a collector and an emitter, whose base is connected to said voltage supply terminal via fifth resistor, and is grounded via a diode, whose collector is connected to the emitter of said fifth transistor, and whose emitter is grounded via sixth resistor.

11. The color signal processing circuit according to claim 7, wherein
said harmonic filter means comprises:
a voltage supply terminal for receiving a predetermined voltage;
a first transistor having a base, a collector and an emitter, whose base is connected to said oscillating circuit means via first and second resistors, and is grounded via a first capacitor, and whose collector is connected to said voltage supply terminal;
a second transistor having a base, a collector and an emitter, whose base is connected to said voltage supply terminal, whose collector is connected to the emitter of said first transistor, and whose emitter is grounded via a third resistor;
a third transistor having a base, a collector and an emitter, whose base is connected to the connection point of said first and second resistors via a second capacitor, and whose collector is connected to said voltage supply terminal; and
a fourth transistor having a base, a collector and an emitter, whose base is connected to said voltage supply terminal, whose collector is connected to the emitter of said third transistor, and whose emitter is grounded via a fourth resistor, a continuous reference subcarrier signal with no harmonic components being obtained at the emitter of said third transistor.

12. The color signal processing circuit according to claim 11, further comprising a bias circuit coupling said harmonic filter means to said oscillating circuit means, said bias circuit comprising:
a fifth transistor having a base, a collector and an emitter, whose base is connected to said oscillating circuit means, whose collector is connected to said voltage supply terminal, and whose emitter is connected to the base of said first transistor via said first and second resistors; and
a sixth transistor having a base, a collector and an emitter, whose base is connected to said voltage supply terminal via a fifth resistor, and is grounded via a diode, the base being connected to the anode of said diode, whose collector is connected to the emitter of said fifth transistor, and whose emitter is grounded via a sixth resistor.

* * * * *

UNITED STATES PATENT AND TRADEMARK OFFICE
CERTIFICATE OF CORRECTION

PATENT NO. : 4,797,732
DATED : January 10, 1989
INVENTOR(S) : Tokio Aketagawa et al.

It is certified that error appears in the above-identified patent and that said Letters Patent is hereby corrected as shown below:

ON THE FIRST INFORMATION PAGE:

Please change

"(30) Priority Data: Japan . . . . . . 51-65844" to

--(30) Priority Data: Japan . . . . . . 61-65844--.

Signed and Sealed this

Fourth Day of July, 1989

Attest:

DONALD J. QUIGG

*Attesting Officer*       Commissioner of Patents and Trademarks